Sept. 13, 1960 N. C. DROSTE 2,952,765
EQUALIZING SPOT WELDING GUN
Filed Nov. 3, 1958 2 Sheets-Sheet 1
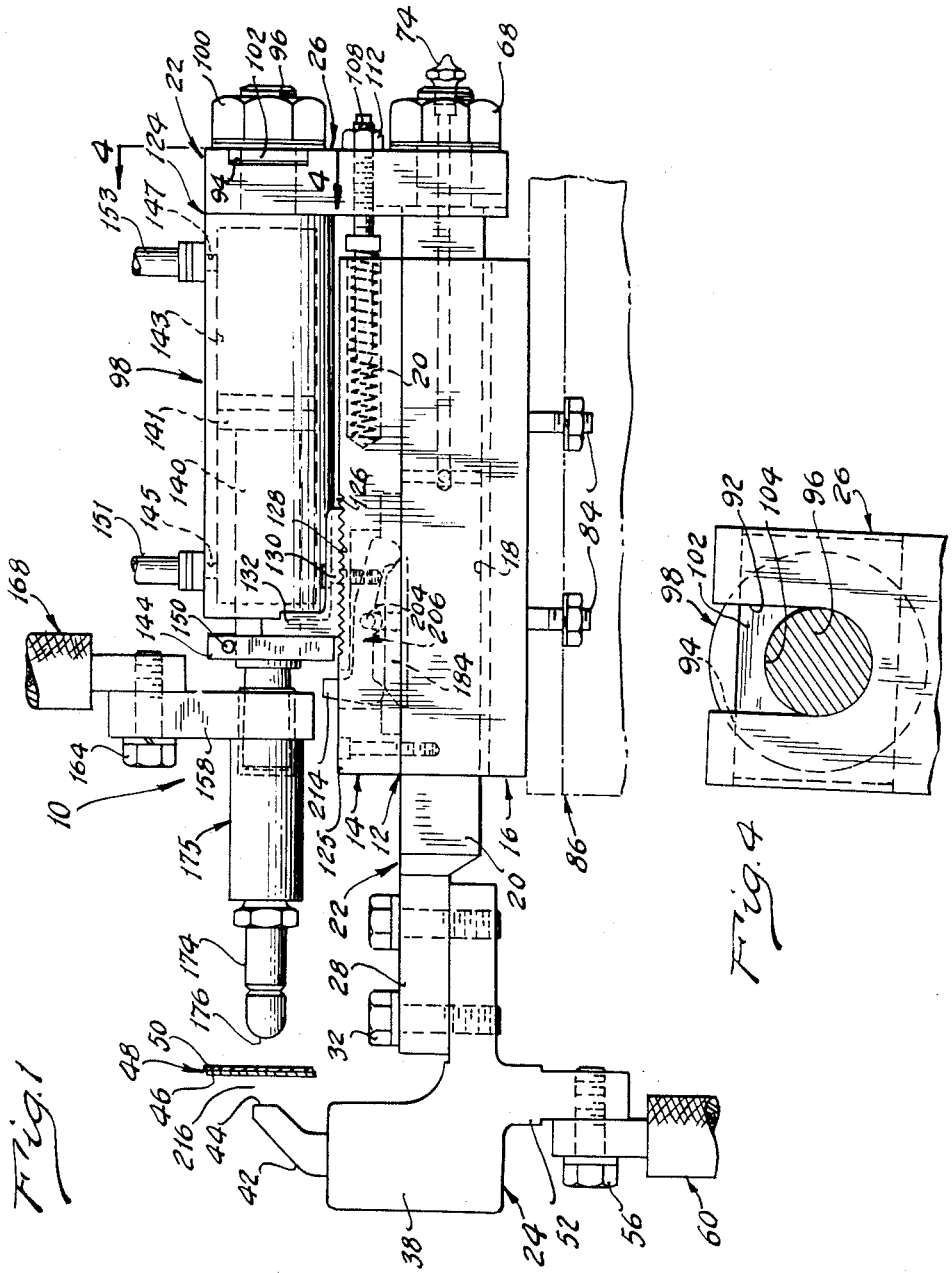
INVENTOR.
NORMAN C. DROSTE.
BY
Barthel & Bugbee
ATTY'S

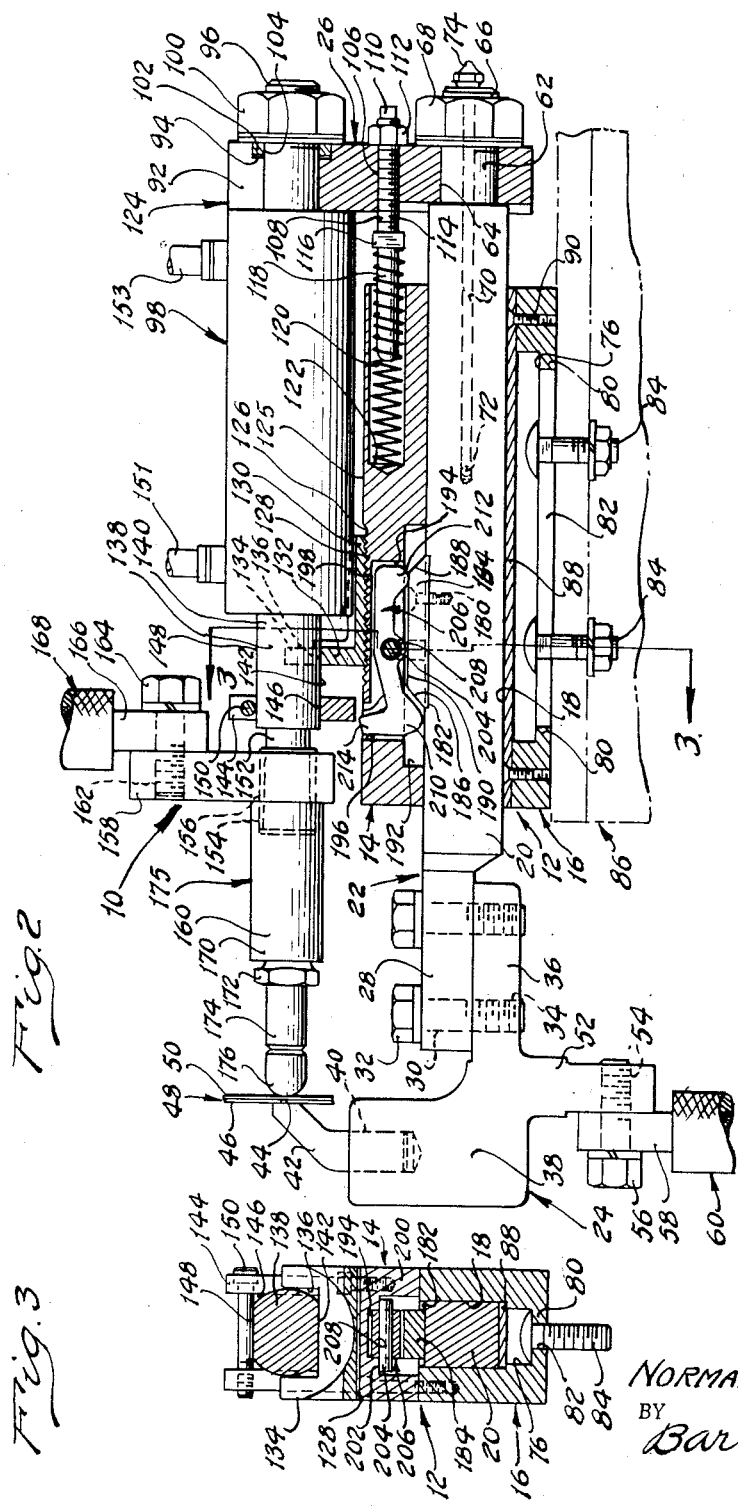

United States Patent Office 2,952,765
Patented Sept. 13, 1960

2,952,765

EQUALIZING SPOT WELDING GUN

Norman C. Droste, 3010 N. Altadena Ave.,
Royal Oak, Mich.

Filed Nov. 3, 1958, Ser. No. 771,592

10 Claims. (Cl. 219—89)

This invention relates to spot welding guns and, in particular, to so-called equalizing spot welding guns.

Hitherto, so-called equalizing welding guns have been devised for the purpose of preventing indentation, by the welding electrodes, of the sheet metal panels or other workpiece components being spot welded, such indentations caused by the welding electrodes of ordinary spot welding guns rendering the welded workpiece assemblies unacceptable to customers. Past equalizing guns, intended to prevent such deformation by halting the movable electrode during its approach to the workpiece assembly until the opposite electrode has also approached the workpiece assembly, have been unsuccessful because of the fact that the moving parts in such prior equalizing guns have been of such weight that they possessed sufficient momentum that they could not be halted accurately in time to prevent denting or other indentation of the workpiece assembly.

Accordingly, one object of this invention is to provide an equalizing spot welding gun wherein the plunger carrying the forward welding electrode and the cylinder and connecting structure carrying the rearward electrode are caused to move in opposite directions by admission of pressure fluid into the cylinder so as to move the electrodes toward each other, means being provided to halt the lighter-weight piston and electrode assembly at a predetermined distance from the workpiece to be welded until the heavier and consequently slower moving cylinder, bracket and rearward welding electrode assembly have moved the rearward electrode up to a predetermined distance from the workpiece assembly, whereupon a stop is automatically released to permit both cylinder and piston to move in opposite directions and bring the electrodes into welding contact with the opposite sides of the workpiece assembly without denting or otherwise deforming the workpiece assembly components.

Another object is to provide an equalizing spot welding gun of the foregoing character wherein the movable stop which halts the forward motion of the plunger and forward electrode is actuated automatically by a cam attached to the electrode mount connecting the electrode to the fluid pressure cylinder.

Another object is to provide an equalizing spot welding gun of the foregoing character wherein there is mounted an angle stop which is adjustable on the base of the welding gun to precisely locate the point at which the moving parts will halt at the end of their retraction strokes.

Another object is to provide an equalizing spot welding gun of the foregoing character wherein the cylinder of the fluid pressure motor for reciprocating the electrodes is equipped with a quick detachable connection between it and its mount, thereby facilitating repairs and replacements without requiring the bodily removal of the welding gun from the work.

Other objects and advantages of the invention will become apparent during the course of the following description of the accompanying drawings, wherein:

Figure 1 is a side elevation of an improved equalizing spot welding gun, according to one form of the invention, with the forward and rearward electrodes shown in their retracted positions for insertion and removal of a workpiece assembly;

Figure 2 is a view similar to Figure 1, but with the parts in their advanced positions engaging the workpiece assembly, portions of the base and the rearward electrode mount being in longitudinal section to disclose the construction more clearly;

Figure 3 is a cross-section taken along the broken line 3—3 in Figure 2; and

Figure 4 is an enlarged fragmentary cross-section taken along the line 4—4 in Figure 1, showing details of the quick detachable connection of the fluid pressure cylinder to its reciprocating mount.

Referring to the drawings in detail, Figures 1 to 3 inclusive show an equalizing spot welding gun, generally designated 10, according to one form of the invention as having a base 12 composed of upper and lower components 14 and 16 containing a bore or guideway 18 of rectangular cross-section (Figure 3) in which a bar 20 is reciprocably mounted. The bar 20 is one component of a reciprocable fluid pressure cylinder mount, generally designated 22, and also includes an L-shaped rearward electrode mount 24 at the forward end of the bar 20 and a transverse cylinder supporting member or bridge member 26 at the rearward end thereof. The forward end of the bar 20 has an offset or reduced thickness portion 28 which is drilled at 30 for the reception of bolts 32 threaded into holes 34 in the longitudinal arm 36 of a forward electrode mount 24, the transverse arm 38 of which has a socket 40 in which the bent forward electrode 42 is inserted and secured. The forward electrode 42 has a contact end face 44 which engages the forward panel or other component 46 of the workpiece assembly 48, the rearward panel or component 50 of which is to be spot welded to the forward component 46. The forward electrode mount 24 has an intermediate lug or welding cable attachment terminal 52 which is drilled as at 54 for the reception of a clamping bolt 56 by which the conductor 58 of a conventional single-conductor welding cable 60 is attached.

The rearward end of the reciprocating bar 20 of rectangular cross-section is provided with a reduced diameter portion 62 of circular cross-section which passes through a similar hole 64 in the bridge member 26 and is threaded on its outer end 66 to receive a retaining nut 68. The rearward end portion of the bar 20 together with its portions 62 and 66, is drilled longitudinally as at 70 (Figure 2) to provide a lubricant channel having a transverse bore 72 at its inner end leading to the side surfaces of the bar 20 and a lubrication injection fitting 74 threaded into the outer end of the bore 70 for the application of a conventional lubricating appliance.

The lower base member 16 immediately below the bore 18 (Figure 3) is provided with a longitudinally-extending groove 76, the lower wall 80 of which is longitudinally-slotted as at 82 for the reception of clamping bolts 84 by which the base 12 is adjustably and slidably secured to the supporting substructure 86. The substructure 86 forms a part of the fixture upon which the welding gun 10 as a whole is mounted. An elongated wear strip or plate 88 is mounted at the bottom of the bore 18 immediately below the bar 20 and secured to the lower base component 16 by the screws 90 (Figure 2).

The upper portion of the bridge member 26 is provided with a U-shaped slot 92 opening upward, and also with a transverse recess 94 extending above and below the lower portion of the slot 92 into which the reduced diameter end shank 96 of a fluid pressure cylinder, generally designated 98, is removably inserted. The rearward end of the reduced diameter portion 96 is threaded to receive a retaining nut 100, and a rectangular key 102 is inserted in the transverse recess 94 and has a central hole 104 through which passes the reduced diameter end shank 96 of the fluid pressure cylinder 98.

The bridge member 26 between the hole 64 and the slot 92 is bored and threaded as at 106 (Figure 2) for the reception of a threaded spring abutment shaft 108 having a squared rearward end portion 110 and a lock nut 112 for locking it in position against the bridge member 26 after adjustment has been made. The spring abutment 108 forwardly of its threaded portion 114 has a spring abutment collar or enlargement 116 from which a smooth spring holding portion 118 extends forwardly. Wound around this spring holding portion 118 is a helical compression spring 120, the rearward end of which is seated against the collar 116 and the forward end of which is seated in and abuts the horizontal socket 122 formed in the rearward end of the upper component 14 of the mount 12. The spring 120 normally urges the cylinder and forward electrode mount unit, generally designated 124, in a rearward direction, namely to the right in Figure 2.

The upper surface 125 of the upper base component 14 is provided with a transversely-corrugated or serrated portion 126 extending longitudinally therealong (Figure 2) and adapted to be engaged by the correspondingly-corrugated lower surfaces 128 of the lower arm 130 of an L-shaped stop 132, the upstanding arm 134 of which is provided with a half rectangular notch 136 (Figure 3) which receives the forward portion 138 of the plunger 140 which is reciprocable in the fluid pressure cylinder 98 and which carries the usual piston head 141 reciprocable in the cylinder bore 143 (Figure 1). The forward end portion 138 of the plunger 140 is flattened as at 142 on its underside for sliding engagement with and guidance by the bottom of the notch 136. The cylinder 98 is provided at the opposite ends of its bore 143 with service ports 145 and 147 to which are connected service pipes or conduits 151 and 153 which in turn lead to a hydraulic pump or air compressor (not shown) by way of a conventional control valve (also not shown).

Also mounted on the forward portion of the plunger 140 is a dog 144 which also has a half rectangular or approximately U-shaped notch 146 receiving the forward plunger end portion 138 which also has a flattened upper surface 148 (Figure 3) parallel to the surface 142 and adapted to be engaged by the side or shank of a screw 150 threaded through the upper part of the dog 144 to close the notch 146 therein and secure the dog 144 firmly to the plunger end portion 138.

Threaded or otherwise mounted upon the reduced diameter forward end 152 of the plunger 140 is an insulating sleeve 154 of suitable electrical insulating material, the exterior of which passes through a bore 156 in a welding cable attachment terminal 158 which in turn engages an elongated rearward electrode holder 160 threaded upon the insulating sleeve 154. The welding cable attachment terminal 158 extends upwardly from the plunger end portion 152 (Figure 2) and is drilled and threaded as at 162 to receive a clamping bolt 164 by which the conductor 155 of a second welding cable 158 is secured. The rearward electrode holder 160 is bored and threaded longitudinally as at 170 to receive a chuck 172 in which the rearward welding electrode 174 is removably mounted. Collectively the plunger 140, dog 144, terminal 158 and electrode holder 160 form a plunger-and-holder unit, generally designated 175. The welding electrodes 42 and 174 are conventional and the rearward electrode 174 has a rounded contact end 176 which engages the rearward workpiece component 50, the forward component 46 of which is engaged by the corresponding contact surface 44 of the forward welding electrode 42.

Secured as by the screws 180 in the elongated recess 182 in the upper side of the bar 20 is an elongated cam 184 having inclined forward and rearward ends 186 and 188 respectively (Figure 2) and an intermediate substantially horizontal elongated dwell portion 190 extending between them. The cam 184 is received in an elongated recess 192 in the upper base member 14 and extends upward from the upper side of the bore 18 therein. Extending upward from the recess 192 is a pocket 194 immediately below the corrugated portion 126 thereof. A slot or opening 196 extends from the upper forward end of the pocket 194 through the wall 198 carrying the corrugations 126 to the upper surface 125 of the base 12.

The opposite side walls 200 of the pocket 194 in the upper base member 14 are drilled as at 202 (Figure 3) to receive the opposite ends of a pivot pin 204 on which is rockably mounted a stop lever, generally designated 206. The stop lever 206 is bored as at 208 in its approximate midportion to receive the pivot pin 204 and has downwardly-projecting rounded forward and rearward cam follower ends 210 and 212 respectively which are adapted to separately engage the forward and rearward inclined portions or ramps 186 and 188 of the cam 184 and also to slide along the horizontal top or dwell surface 190 thereof. The forward end of the stop lever 206 is also provided with an upwardly-projecting hook portion 214 which is adapted to be projected upwardly through the opening 196 into the path of the dog 144 so as to arrestingly engage the dog 144, as explained below in connection with the operation of the invention, in response to the action of the cam 184 as the cylinder mount 22 and cylinder 98 constituting the unit 124 move back and forth relatively to the base 12.

In the operation of the invention, let it be assumed that the base 12 of the welding gun 10 has been mounted on the welding fixture 86 and adjusted to its proper position for receiving the workpiece assemblies 48 passing through the gap 216 between the contact ends 44 and 176 of the forward and rearward electrodes 42 and 174 respectively. Let it also be assumed that the welding cables 60 and 168 have been connected to a suitable welding transformer, and that the service pipes 151 and 153 have also been connected to a suitable fluid pressure circuit either pneumatic or hydraulic, as the case may be, for reciprocating the plunger 140. Let it further be assumed that the parts are in their retracted positions shown in Figure 1, with the hook portion 214 of the stop lever 206 projecting upwardly through the opening 196 above the upper surface 125 of the upper component 14 of the base 12 (Figure 1). This position of the cam lever 206 is brought about by the engagement of the forward rounded lower portion 210 of the cam lever 206 with the dwell portion 190 of the cam 184 while the rearward lower rounded portion 212 thereof is disposed rearwardly of the rearward cam incline 188.

The pressure fluid which enters the rearward service port 147 in the cylinder 98 immediately acts against the rearward side of the piston head 141 to move the plunger-and-rearward-electrode-holder unit 175 forwardly, and at the same time acts against the rearward end of the cylinder 98 to move the cylinder-and-forward-electrode-mount unit 124 rearwardly. Due to the lighter weight of the forwardly-moving unit 175, it moves more rapidly forward than the unit 124 moves rearwardly, but the depending dog 144 on the plunger 140 is intercepted and halted by the upwardly projecting hook portion 214 of the stop lever 206 before it reaches the workpiece component 50. The unit 124, however, continues to move rearwardly from the position shown in Figure 1 to that of Figure 2, whereupon the rearward ramp 188 of the rearwardly-moving cam 184 engages the rounded rearward end 212 of the stop lever 206 and pushes upward while at the same time the dwell portion 190 and forward ramp 186 of the cam 184 slide rearwardly from beneath the rounded forward end portion 210 of the stop lever 206. The combined effect of these actions is to swing the stop lever 206 in a counterclockwise direction around its pivot pin 204 from the projected position of Figure 1 to the retracted position of Figure 2, withdrawing the hook portion 214 from its position obstructing the path of the dog 144 to a position releasing the dog 144 and permitting the plunger-carried unit 175 to continue its forward motion into engagement of the rearward electrode 174 with the workpiece component 50 while the cylinder unit 124 continues its rearward motion to bring the forward electrode 42 into engagement with the component 46 of the workpiece assembly 48. This action squeezes the workpiece components 46 and 50 into firm engagement with one another while at the same time the establishment of welding contact causes a flow of electric welding current between the electrodes 42 and 174 through the workpiece assembly 48, generating a high heat and consequently welding the components 46 and 50 to one another.

To retract the moving parts, the operator reverses the control valve (not shown) to supply pressure fluid to the forward service pipe 151 and port 145 and discharge it from the rearward service pipe 153 and port 147. The reverse of the foregoing movement then takes place, the plunger-carried unit 175 moving rearwardly by the action of the pressure fluid on the forward side of the piston head 141 while the cylinder and mount unit 124 moves forwardly in response to the action of the pressure fluid against the forward end of the cylinder 98. These units 175 and 124 continue to move toward one another until they engage the opposite sides of the upstanding arm 134 of the L-shaped stop 132 and are brought to a halt in the relative positions shown in Figure 1. While this is occurring, the forward movement of the cam 184 on the bar 20 causes its forward ramp 186 to engage the rounded forward end 210 of the stop lever 206, rocking the latter clockwise around its pivot pin 204 while the rounded rearward end portion 212 thereof descends the rearward ramp 188 into the position shown in Figure 1. The gap 216 is thus opened up between the electrodes 42 and 174 so that the welded workpiece assembly 48 can be removed and an unwelded assembly 48 inserted for the next welding operation which proceeds as described above.

What I claim is:

1. An equalizing spot welding gun, comprising a base structure, a supporting structure movably mounted on said base structure for travel toward and away from a predetermined welding location for a workpiece, a first welding electrode holder mounted on said supporting structure for travel therewith toward and away from said welding location, a fluid pressure cylinder mounted on said supporting structure for travel therewith, a piston reciprocably mounted in said cylinder for travel relatively thereto toward and away from said welding location, a second welding electrode holder mounted on said piston for travel therewith toward and away from said first welding electrode holder, a stop member movably mounted on one of said structures for motion into and out of halting engagement with the other structure, and means responsive to the arrival of said supporting structure at a predetermined point in the travel thereof for retracting said stop member from said halting engagement with said other structure.

2. An equalizing spot welding gun, according to claim 1, wherein said stop member is pivotally mounted on said one structure and said means includes a stop-actuating element on said other structure operatively engageable with said stop member.

3. An equalizing spot welding gun, according to claim 2, wherein said stop-actuating element includes a cam movable into retracting engagement with said stop member in response to a predetermined travel of said supporting structure.

4. An equalizing spot welding gun, according to claim 3, wherein said cam has at one end a stop-member-retracting portion and at its other end a stop-member-projecting portion.

5. An equalizing spot welding gun, according to claim 2, wherein said stop member includes a stop lever having a stop portion thereon and a contact portion thereon engageable with said stop-actuating element.

6. An equalizing spot welding gun, according to claim 5, wherein said stop-actuating element includes a stop-member-retracting portion and a stop-member-projecting portion spaced apart therefrom.

7. An equalizing spot welding gun, according to claim 1, wherein said means includes a cam mounted on said supporting structure in a path of interception with said stop member.

8. An equalizing spot welding gun, according to claim 1, wherein said base structure also carries a retraction stop disposed adjacent the paths of travel of said piston and of said cylinder, and wherein said piston and said cylinder have retraction-stop-engaging portions connected thereto and movable therewith and engageable with said retraction stop at predetermined points in the retraction strokes of said piston and said cylinder away from the welding location.

9. An equalizing spot welding gun, according to claim 8, wherein said retraction stop is adjustably movable relatively to said base structure and wherein means is provided for releasably securing said retraction stop in its adjusted position.

10. An equalizing spot welding gun, according to claim 1, wherein said supporting structure has a transverse recess in the upper portion thereof and a vertical slot extending downwardly from the end thereof into said recess, and wherein an elongated key is disposed in said recess and extends across said slot, said key having therein a hole and said fluid pressure cylinder having a shank extending through said hole, said shank having means thereon for securing said shank to said supporting structure and for holding said key in said recess.

References Cited in the file of this patent
UNITED STATES PATENTS
2,879,373    Fagge _____ Mar. 24, 1959